(12) United States Patent
Rash et al.

(10) Patent No.: US 7,704,032 B2
(45) Date of Patent: Apr. 27, 2010

(54) TRANSPORTABLE STORAGE FACILITY

(75) Inventors: Mark Rash, Forest, VA (US); Lisa K. Taylor, Forest, VA (US)

(73) Assignee: MGL Storage Partners, Inc., Forest, VA (US)

( * ) Notice: Subject to any disclaimer, the term of this patent is extended or adjusted under 35 U.S.C. 154(b) by 0 days.

(21) Appl. No.: 10/917,987

(22) Filed: Aug. 12, 2004

(65) Prior Publication Data

US 2005/0053442 A1   Mar. 10, 2005

Related U.S. Application Data

(60) Provisional application No. 60/494,774, filed on Aug. 13, 2003.

(51) Int. Cl.
  *B65F 9/00* (2006.01)
  *B65G 67/00* (2006.01)

(52) U.S. Cl. ............... 414/391; 280/35; 280/425.2; 414/399; 414/498; 414/572; 414/607; 254/45

(58) Field of Classification Search ......... 414/459, 414/458, 460, 498, 607, 785, 391; 254/45; 280/479.1, 656; 52/143
See application file for complete search history.

(56) References Cited

U.S. PATENT DOCUMENTS

| | | | | |
|---|---|---|---|---|
| 2,069,236 A | * | 2/1937 | Fitch | ............................ 254/45 |
| 2,934,373 A | * | 4/1960 | Doty, Jr. | ..................... 414/498 |
| 3,151,751 A | * | 10/1964 | Marini | ....................... 414/572 |
| 3,289,868 A | * | 12/1966 | Miller et. al. | ................. 254/45 |
| 3,500,900 A | * | 3/1970 | Kupka | .......................... 165/47 |
| 3,520,433 A | * | 7/1970 | Blackburn | ................. 414/498 |
| 3,606,944 A | * | 9/1971 | Cadillac | .................... 206/335 |
| 3,612,568 A | | 10/1971 | Stensrud | |
| 3,666,312 A | | 5/1972 | Harris | |
| 3,743,363 A | * | 7/1973 | Hodge et al. | ............. 303/115.4 |
| 3,788,683 A | | 1/1974 | Rumell | |
| 3,792,595 A | | 2/1974 | Willis | |
| 3,817,413 A | * | 6/1974 | Ham | ......................... 414/498 |

(Continued)

FOREIGN PATENT DOCUMENTS

DE         1580354 A        7/1970

(Continued)

OTHER PUBLICATIONS

Great Crates Storage Crates 3-page web site printout, www.greatcratestorage.com.

(Continued)

*Primary Examiner*—Gregory W Adams
(74) *Attorney, Agent, or Firm*—Charles S. Sara, Esq.; DeWitt Ross & Stevens S.C.

(57) ABSTRACT

A self-contained mobile storage container includes a truck having a platform with a track, a storage container removably placed on the track on the platform, wherein the storage container includes a front end, a rear end and parallel sides. In addition, there are devices to secure the storage container to the platform, as well as a lift to elevate the storage container and remove it from the platform. Other devices are included to maneuver the storage container to a different geographical location for storage.

3 Claims, 11 Drawing Sheets

U.S. PATENT DOCUMENTS

| | | | |
|---|---|---|---|
| 3,885,691 A * | 5/1975 | Knapp | 414/495 |
| 4,452,555 A * | 6/1984 | Calabro | 410/53 |
| 4,551,059 A * | 11/1985 | Petoia | 414/459 |
| 4,611,816 A * | 9/1986 | Traister et al. | 280/43.2 |
| 4,825,977 A * | 5/1989 | Isogai | 187/206 |
| 4,897,011 A * | 1/1990 | Brower | 414/459 |
| 4,940,252 A * | 7/1990 | Seib | 280/418.1 |
| 5,324,160 A * | 6/1994 | Smith | 414/475 |
| 5,429,472 A * | 7/1995 | Dahl | 414/787 |
| 5,529,452 A * | 6/1996 | Boyles et al. | 414/460 |
| 5,562,390 A * | 10/1996 | Christenson | 414/477 |
| 5,624,225 A * | 4/1997 | Cox | 414/495 |
| 5,662,450 A * | 9/1997 | Roberts | 414/347 |
| 5,749,234 A | 5/1998 | Takano | |
| 5,785,485 A * | 7/1998 | Hall | 414/498 |
| 5,884,794 A | 3/1999 | Calhoun et al. | |
| 6,056,122 A | 5/2000 | Takeuchi | |
| 6,071,062 A | 6/2000 | Warhurst et al. | |
| 6,155,770 A | 12/2000 | Warhurst | |
| 6,439,131 B1 | 8/2002 | Higgins | |
| 2001/0038009 A1 | 11/2001 | Payne | |
| 2002/0180179 A1* | 12/2002 | Krauss | 280/460.1 |
| 2003/0206781 A1* | 11/2003 | Moore et al. | 410/46 |

FOREIGN PATENT DOCUMENTS

| | | |
|---|---|---|
| DE | 1926978 A | 11/1970 |
| DE | 7302826 U | 1/1973 |
| DE | 8808247 U | 7/1989 |
| DE | 9014480 U | 10/1990 |
| GB | 1347418 A | 4/1972 |

OTHER PUBLICATIONS

Pods® 3-page web site printout, www.putitinapod.com.
Door to Door 5-page web site printout, www.doortodoor.com.

* cited by examiner

TRANSPORTABLE STORAGE FACILITY

CROSS-REFERENCE TO RELATED APPLICATIONS

This application claims priority under 35 USC §119(e) to U.S. Provisional Application Ser. No. 60/494,774, filed Aug. 13, 2003, the entirety of which is incorporated herein.

FIELD OF THE INVENTION

The present invention is directed to a self contained mobile storage container. The invention also includes a method for transporting the storage container between locations.

BACKGROUND OF THE INVENTION

The moving and storage industry often serves consumers who need to store large amounts of material for varying lengths of time. This situation arises when families are changing jobs and moving to different cities, remodeling their current home, and more. Customers who need off-site storage are often in the throes of a stressful situation made even more so by the inconvenience, expense and inefficiency of traditional moving and storage options.

Traditionally, moving and storage options consist of a warehouse divided into multiple units which can be rented for expensive fees. To use traditional storage units, the customer must either pay someone to load the material requiring storage or do so themselves and bring it to the storage facility. The material is then unloaded and packed away in the storage unit. When storage is no longer needed, the material must be removed from the storage facility, reloaded into a truck, transported back to the desired location and finally unloaded yet again. The material to be stored is handled a total of four times, resulting in great inefficiency and rising costs.

Another inconvenience with traditional mini-storage and moving options is the location of the storage units. Traditional moving and storage units are often located in out of the way neighborhoods, as space for storage units is rarely found in downtown areas. Space for long-term storage is hard to find in any situation, but especially in large metropolitan areas where even space for parking is at a premium. In the rare instance storage space is conveniently located, it is often exorbitantly expensive.

A search of relevant prior art shows several patents relate to storage containers. U.S. patent application No. 2001/0038009 A1 to Payne describes a transport and storage system comprising a cargo container with multiple compartments containing a variety of storage modules. These storage modules can be cabinets, boxes, chests, racks, closets or other containers. In addition, the cargo container can be used without the storage modules. U.S. patent application No. 2002/0180179 A1 to Krauss describes a transportable storage container a well as a specialized transportation assembly. U.S. Pat. No. 3,666,312 to Harris describes a mobile storage box designed for cleaning up pollutants, such as oil spills, from bodies of water. U.S. Pat. No. 3,612,568 to Stensrud describes a steerably-wheeled, transportable cargo container comprising a covered flatbed, accessed by removing the container's cover. U.S. Pat. No. 6,056,122 to Takeuchi describes a large transportable storage container with a boxlike cover. U.S. Pat. No. 3,788,683 to Rumell describes a transport vehicle with a portable cargo container and a transport vehicle with a wheel bed and a removable and reusable freight hauling and storing container. U.S. Pat. No. 6,439,131 to Higgins describes a convertible highway and rail freight vehicle. U.S. Pat. No. 5,749,234 to Takano describes a transportable storage closet with an insulated container.

However, the prior art does not provide the unique alternative to traditional mini-storage and moving options offered by the present invention wherein the storage space is delivered directly to the consumer. It is an object of this invention to provide a mobile storage container that can be transported directly to the consumer for loading, and then stored anywhere that has the required machinery. When storage is no longer needed, the entire storage container is transported directly to the customer for unloading. This reduces the work load by half because the stored material is only handled twice instead of the typical four times using traditional storage options. It is an object of this invention to provide a mobile storage container that is readily convertible from an immobile storing container to a mobile wheeled hauling container for easy transfer or placement. It is a further object of this invention to provide a mobile storage container that can be stored in any space large enough for the container to stand. Further, it is an object of this invention to provide a secure, weatherproof storage container that increases efficiency and reduces costs.

SUMMARY OF THE INVENTION

The invention described herein addresses these and other drawbacks of conventional transport and storage units by providing a mobile storage container and a method for transporting that container. The invention comprises a storage container with a door (rear door or side door and/or front door) and a set of long, parallel tracks running underneath the length of the storage container. The storage container also contains portable dolly wheels which slide into rear corner shafts of the container, which are secured by locking pins when the container is being moved on the ground for loading or unloading. A pintle ring hitch is attached to the front of the storage container to move the container for loading or unloading. The pintle ring hitch and the portable dolly wheels are removed from the container when not in use.

The present invention is also directed to a mobile transport and storage system, comprising a truck having a platform such as a trailer. A storage container comprising a first front end, a second rear end, first and second parallel sides, a top end and a bottom end is removably placed on the trailer using a means to secure the storage container to the trailer. A means to lift and remove the storage container from the trailer is also provided, as is a means to maneuver the storage container to a different geographical location.

The means to maneuver the storage container comprises removable dolly wheels which support the rear of the storage container, wherein the storage container includes slots for receiving the dolly wheels. A removable connecting means is attached to the front of the storage container to attach a transportation device for moving the storage container.

The present invention is further directed to a mobile storage container adapted to be supported by and transported with a truck, wherein the truck includes a platform for supporting the cargo container. The storage container comprises at least two runners extending parallel to each other on the underside of the storage container and extends from the front to the rear of the storage container and is adapted to flank the track of the platform. In addition, a means to secure the storage container to the platform is provided comprising at least one locking pin for each runner.

A preferred embodiment of the invention is a mobile transport and storage system, comprising, in combination: a vehicle having a platform defined thereon; a storage container removably disposed on the platform, the storage container including a front end, a rear end, first and second parallel sides, a top side and a bottom side; at least one lock-down unit dimensioned and configured to releasably secure the storage container to the platform; a lift dimensioned and configured to lift and remove the storage container from the platform; and releasable means to aid movement of the storage container when it is removed from the platform, wherein the means are releasably attached to the storage container.

Yet another preferred embodiment of the invention is a mobile storage container adapted to be supported by and transported by a vehicle, wherein the vehicle defines a platform for supporting the storage container. Here, the storage container comprises: a storage container comprising a front end, a rear end, first and second parallel sides, a top side, and a bottom side; at least two slides defined in, or disposed on, the bottom side of the storage container, wherein the two slides are substantially parallel to one another, and wherein the two slides run lengthwise in a direction extending from the front end of the storage container toward the rear end of the storage container; at least one locking hitch to secure the storage container to the platform; at least one removable dolly wheel assembly supporting the storage container; and removable connecting means attached to the storage container.

In practice, the storage container of the present invention is chosen based on the storage needs of the customer. Portable dolly wheels are secured to the rear of the storage container with locking pins. A pintle ring is connected to the front of the storage container by inserting the pintle ring into the parallel tubes on the underside of the storage container and is secured to the storage container with locking pins. The pintle hitch on a fork-lift is also secured to the pintle ring on the front of the storage container. After the pintle ring and hitch are connected to the fork lift, the fork lift raises the front of the storage container off the ground to the minimum height required for the fork lift to safely pull or tow the container to the lift area. The fork lift transports the storage container to a lift, where the storage container is placed onto the lift and the pintle ring on the storage container is disconnected from the pintle hitch connected to the forklift. The pintle ring and the portable dolly wheels are then removed from the storage container until needed again. While a forklift is described herein, any sort of industrial lift known to the art can be used, including a tractor or tow-truck. The storage container is lifted to the desired height and a trailer or truck is moved into position underneath the container. The storage container is then lowered onto the trailer or truck for transport and secured to the truck or trailer frame. The storage container is then ready for transport to a customer for loading. Upon return, the process is reversed and the filled container is stored until needed.

While most of the mobile storage systems of the prior art require heavy machinery, e.g., tractor trailers, large cranes and large forklifts, and professional drivers to operate the system, one advantage of the present invention is the simplicity of the system. The present invention advantageously allows home-owners and individuals to move the storage containers without requiring outside professionals. Further, the advantages of this invention include the increased efficiency of a mobile storage container. A mobile storage container requires half the work load of traditional storage units. An additional advantage is that this storage container is secure, weatherproof and can be moved multiple times. Also, this mobile storage container can be stored anywhere that has the required fork-lifts and lifts. Further, an advantage of this invention is

DETAILED DESCRIPTION OF THE INVENTION

Figure 1:
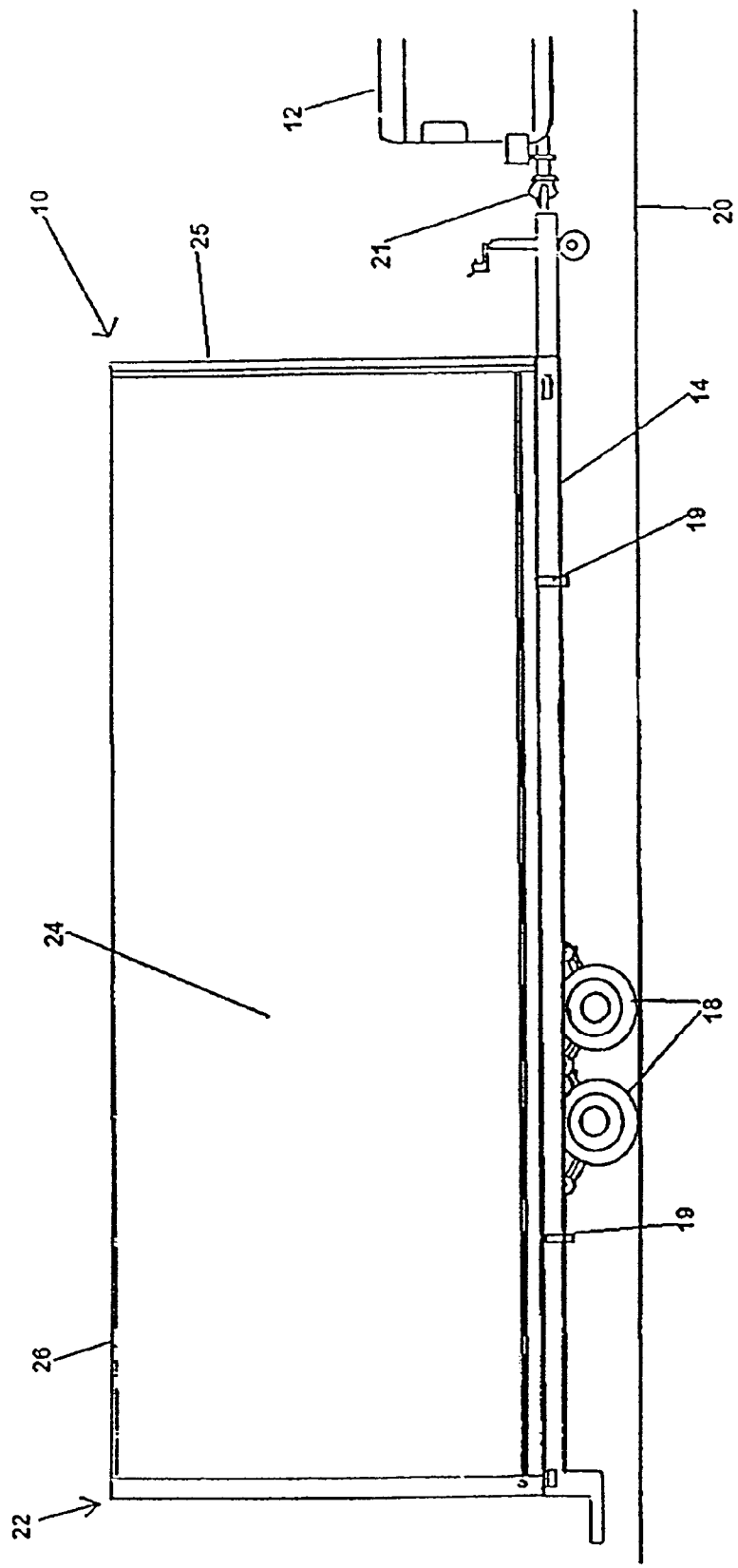
FIG. 1 is a side elevation view of the mobile transport and storage system of the present invention.

Referring now more particularly to the drawings, a mobile transport and storage system 10 in the form of a truck 12 and a flatbed trailer 14 is shown in FIG. 1. The trailer 14 is supported by wheels 18 and may be removably attached to the truck 12 by a conventional hitch 21. The trailer 14 can also support a steel box 35 (shown in FIG. 3) in which can be stored a portable loading ramp (not shown) for accessing the storage container 22. The flatbed trailer 14 used in the present invention can be one of several designs commonly known to the trailer industry, such as those manufactured by Hudson Trailers (Indian Trail, N.C.). Further, it will be understood that while a trailer truck 12 is shown in the illustrated embodiment, the invention is similarly applicable to other forms of transport vehicles. For example, it is within the scope of the present invention to provide the system 10 with a truck 12 which supports the storage container 22 without the need of a trailer 14. In other words, the truck 12 can include an integrated trailer section that is not reversibly detachable.

Figure 2:
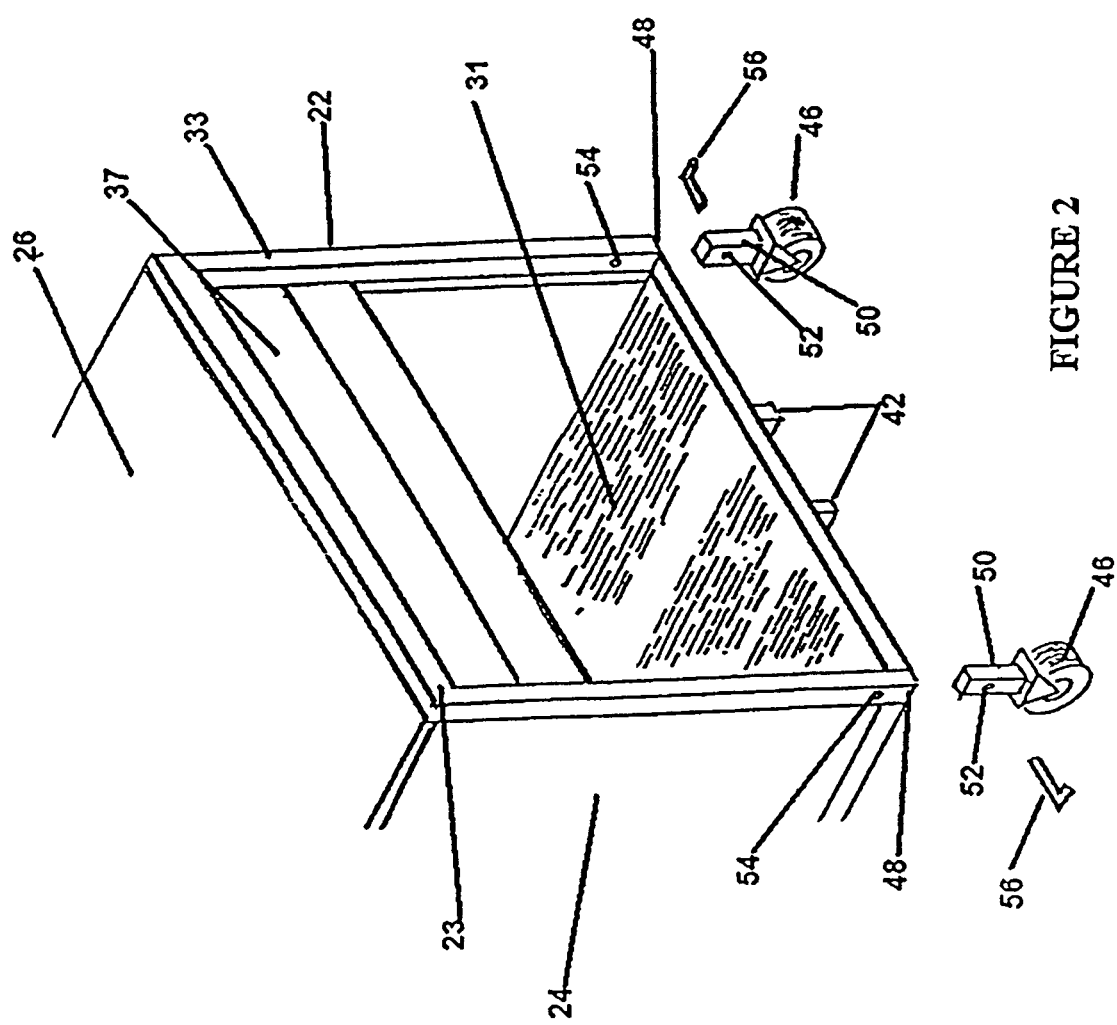
FIG. 2 is a partial perspective and exploded view of the rear section of the storage container illustrating the placement of the portable dolly wheels.

Referring now to FIGS. 1 and 2, a removable and reusable storage container 22 is supported on the flatbed trailer 14. (The trailer is obscured from view in FIG. 2.) The storage container 22 includes a rectangular base and frame construction with a rear wall 23 comprising a movable door 37, two side walls 24, a front wall 25 (see FIG. 1) and a roof 26. The rear wall 23 of the storage container 22 includes openings 54 for locking pins 56 to secure portable dolly wheels 46.

Figure 3:
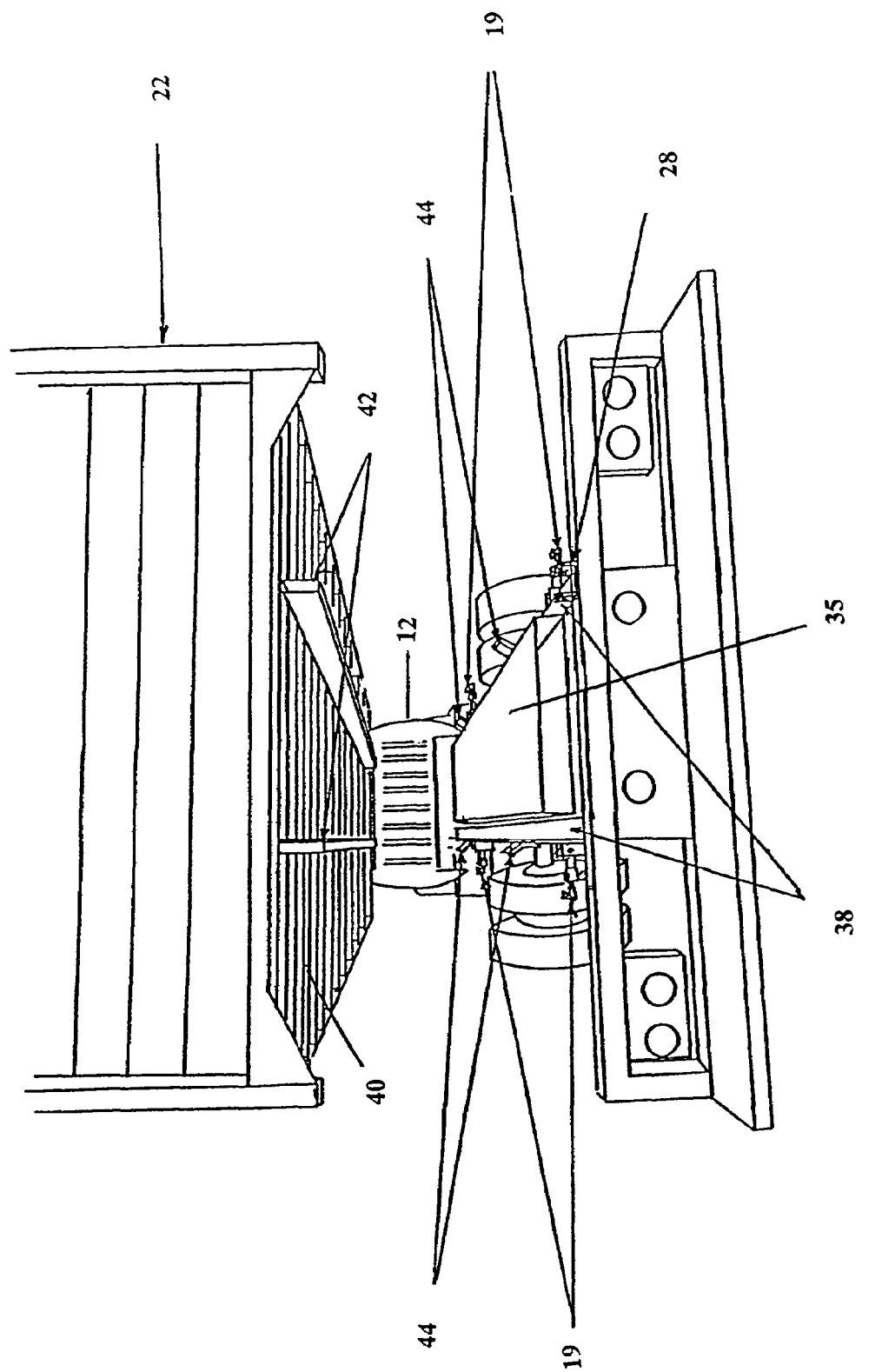
FIG. 3 is an exploded rear view of the truck or trailer bed platform and storage container.

As illustrated in FIG. 3, the storage container 22 preferably includes at least one, and preferably a pair of parallel slides 42, which traverse the underside 40 of the storage container 22. The slides 42 extend substantially from the front 25 of the container to the rear 23 of the container. Although the dimensions of the slides 42 may be adjusted depending on the needs of the operator or the system 10, the slides are preferably fabricated from 2 inch×6 inch steel tubes. The storage container 22 is typically sized to accommodate the needs of the operator or customer. Preferably, the height of the container 22 can range from about six feet to about nine feet with about seven feet, seven inches being preferred. The width of the container 22 can preferably ranges from about eight feet to about eight feet six inches, with about eight feet being most preferred. The length of the container 22 is again dependent on the needs of the customer. Preferably, a variety of lengths of container 22 can be used, ranging from about eight or less feet to about twenty four or more feet. Containers parting from these preferred dimensions are explicitly within the scope of the claimed invention.

When preparing to transport the storage container 22, the truck 12 containing the trailer 14 is backed underneath the lifted storage container 22. The storage container 22 is aligned on the trailer 14 by aligning the slides 42 with a plurality of the parallel guides 44 along the length of the trailer 14. (See FIG. 3a for a closer view of the guides 44). The guides 44 are dimensioned and configured to include a first portion fixed to the trailer and extending some distance therefrom, such that the first portion of each guide will closely abut the slides 42 when the storage container 22 is placed upon the trailer. The guides 44 also include a second portion extending outwardly at an obtuse angle from the first portion, thereby defining a channel slightly wider in width than the width across the slides 42. In this fashion, when the container is lowered upon the trailer, the second portion of each guide 44 can act to direct the slides 42 of the container to come to rest squarely between the first portions of the guides.

Figure 3A:
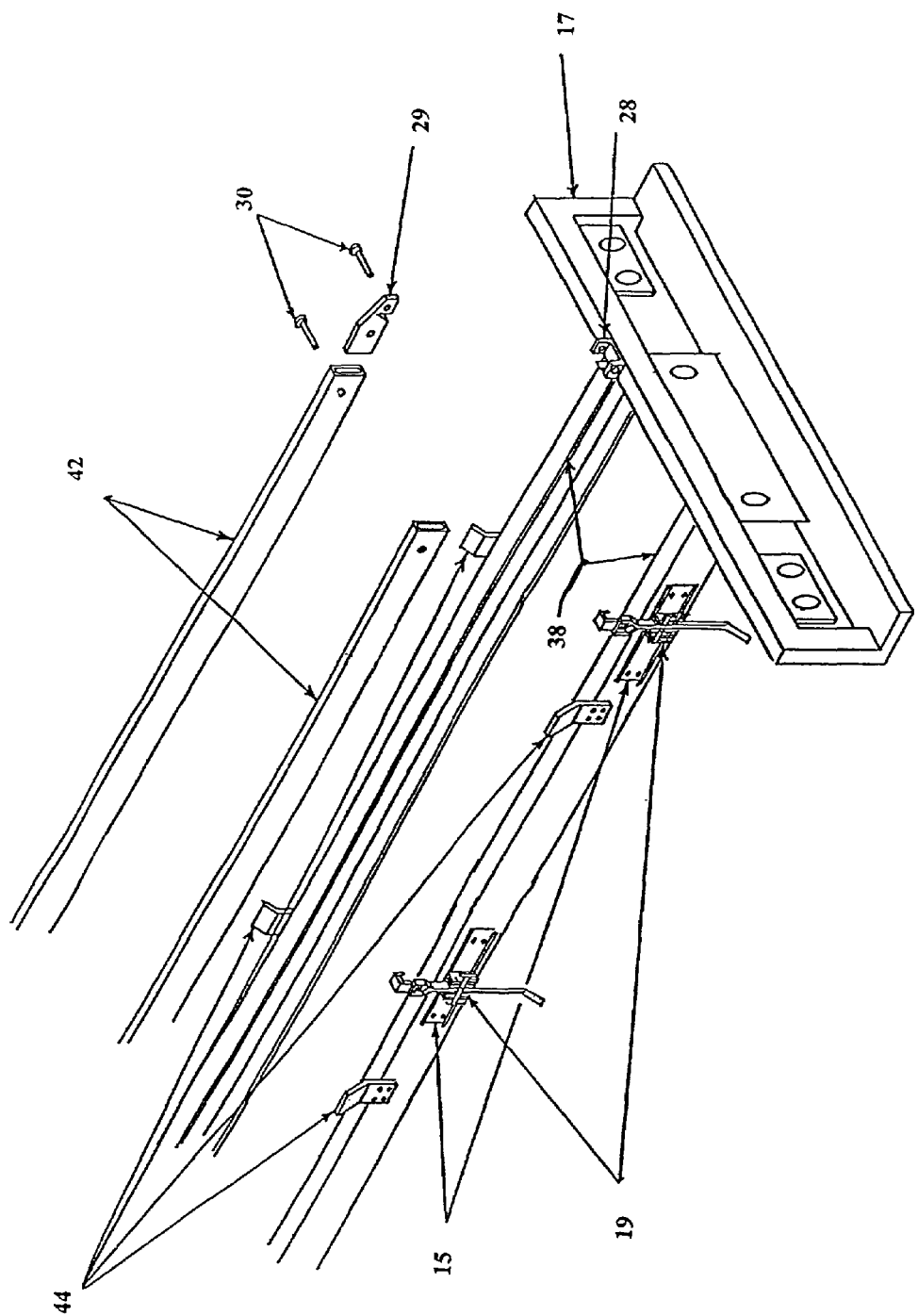
FIG. 3a is a partially exploded side elevation view of the truck or trailer bed.

With the storage container securely disposed between the guides 44, the storage container 22 is then secured to the trailer 14 by at least one and preferably at least four side lock down units 19 (see FIG. 3a). Suitable lock downs of various designs are well known to the art. The lock downs are dimensioned and configured to secure the cargo body 22 to the trailer 14 in a releasable fashion. A rear lock down unit comprising flange 29 and corresponding bracket 28 can also be used to secure the container 22 to the rear bumper 17 of the trailer 14.

Referring now to FIGS. 3 and 3a, there is illustrated an exploded view of the storage container 22 and trailer 14. The trailer 14 is preferably defined by an elongated steel box 35 extending longitudinally from the rear of the trailer 14 forward to a desired length needed to house a portable loading ramp (not shown). Situated on either side of the box 35 are frame-runners 38. The underside 40 of the storage container 22 contains two parallel disposed slides 42 extending longitudinally from the front 25 of the storage container 22 to the rear 23. The slides 42 are preferably formed of steel, iron or some other hardened material and are further designed to be placed on either side of the box 35 directly on top of the frame-runners 38.

Situated externally to the frame-runners 38 are the guides 44. As noted earlier, the guides comprise extensions extending upwardly from the frame-runners 38 and serve to situate the container squarely upon the trailer. The guides 44 are dimensioned, configured, and positioned to receive and direct the slides 42 to the frame-runners 38 as the storage container 22 is placed on top of the trailer 14.

The components of the trailer 14 are shown in more detail in FIG. 3a. At least one, but preferably four lock down units 19, are located on the frame-runners 38. As shown in FIG. 3a, each lock down unit is attached to the frame-runners 38 through via a lock down slide 15. The lock down unit 19 attaches to the frame-runners 38 over the lock down slide 15, thereby allowing the position of the lock down unit 19 to be adjusted based on the needs of the operator. For instance, if the underside 40 of the storage container 22 contains immovable metal struts, the lock down units 19 may need to be moved to secure the container 22 to the trailer 14. The lock down slide 15 allows for this adjustment to the position of the lock down unit 19. Also shown in FIG. 3a is the rear lock down bracket 28 which (in cooperation with flange 29) further secures the rear 23 of the container 22 to the trailer bumper 17, thereby preventing the container 22 from moving forward or backwards on the trailer 14. Rear slide locking pins 30 are used to secure the flange 29 to the trailer 14. Each lock down unit 19 is dimensioned and configured to engage either a slide 42 or the container 22 itself in releasable fashion. Thus, in operation, the container 22 is lowered onto the trailer 14. The guides 44 direct the container to sit squarely on the frame runners 38. The lock down units 19 are then engaged to a slide 44 (or to the container 22) and tightened, thereby releasably securing the container to the trailer.

Figure 4:
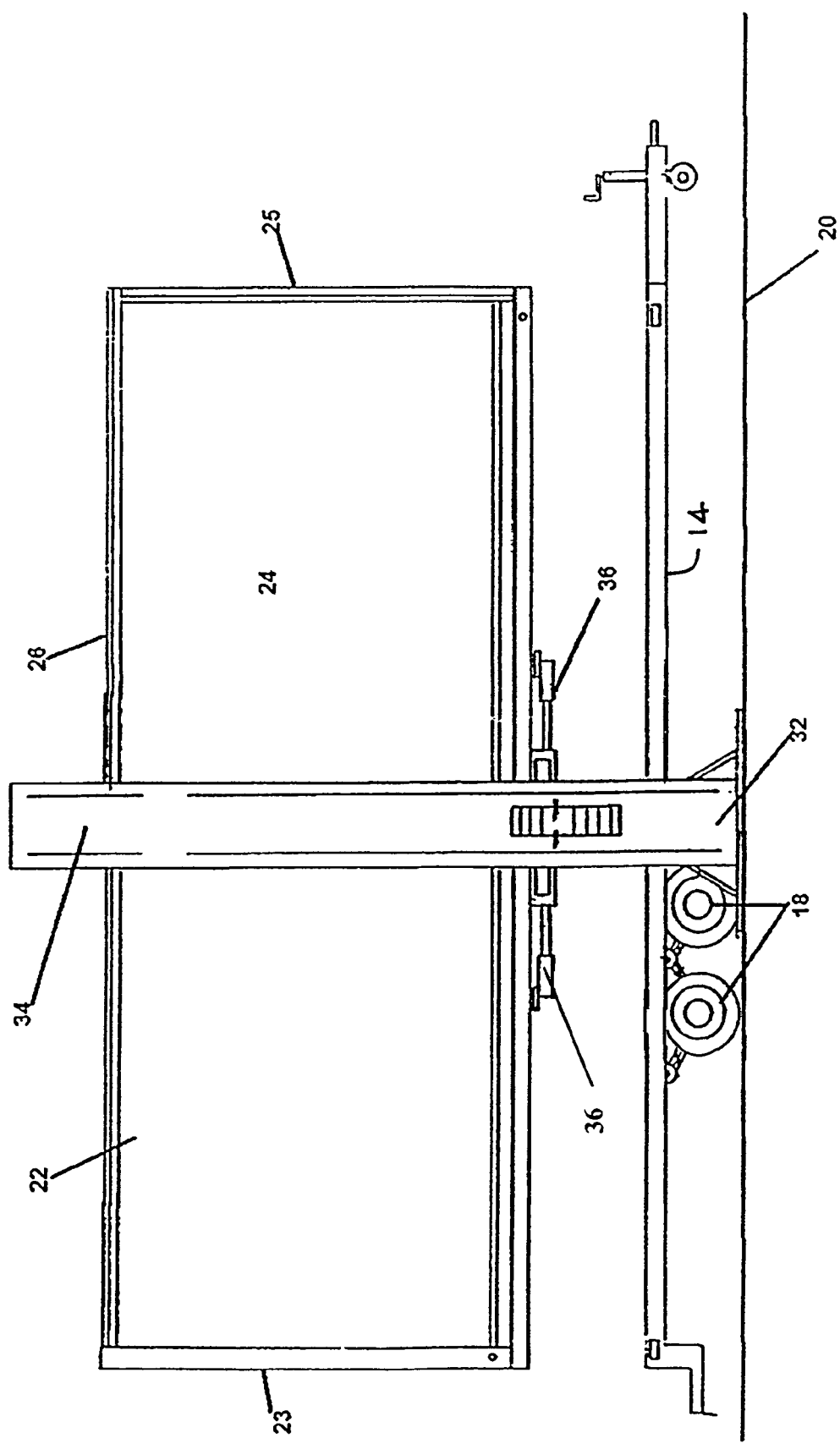
FIG. 4 is a side elevation view of the mobile transport and storage system illustrating the action of a lift on the cargo box.

Referring now to FIG. 4, the storage container 22 is illustrated as it is being separated from the trailer 14. The storage container 22 is removed from the trailer 14 using a lift 32 such as a winch, scaffold hook or other lifting device known to the art. Ideally, the process for separating the storage container 22 from the trailer 14 involves the use of a heavy-duty lift designed to elevate heavy bodies. Such lifts 32 are well-known to the art, particularly in the automotive industry. A representative example of a lift suitable for use in the present invention is manufactured by Rotary Lifts of Madison, Ind. The lifts 32 can be hydraulic, pneumatic, or mechanical in design.

Figure 5:
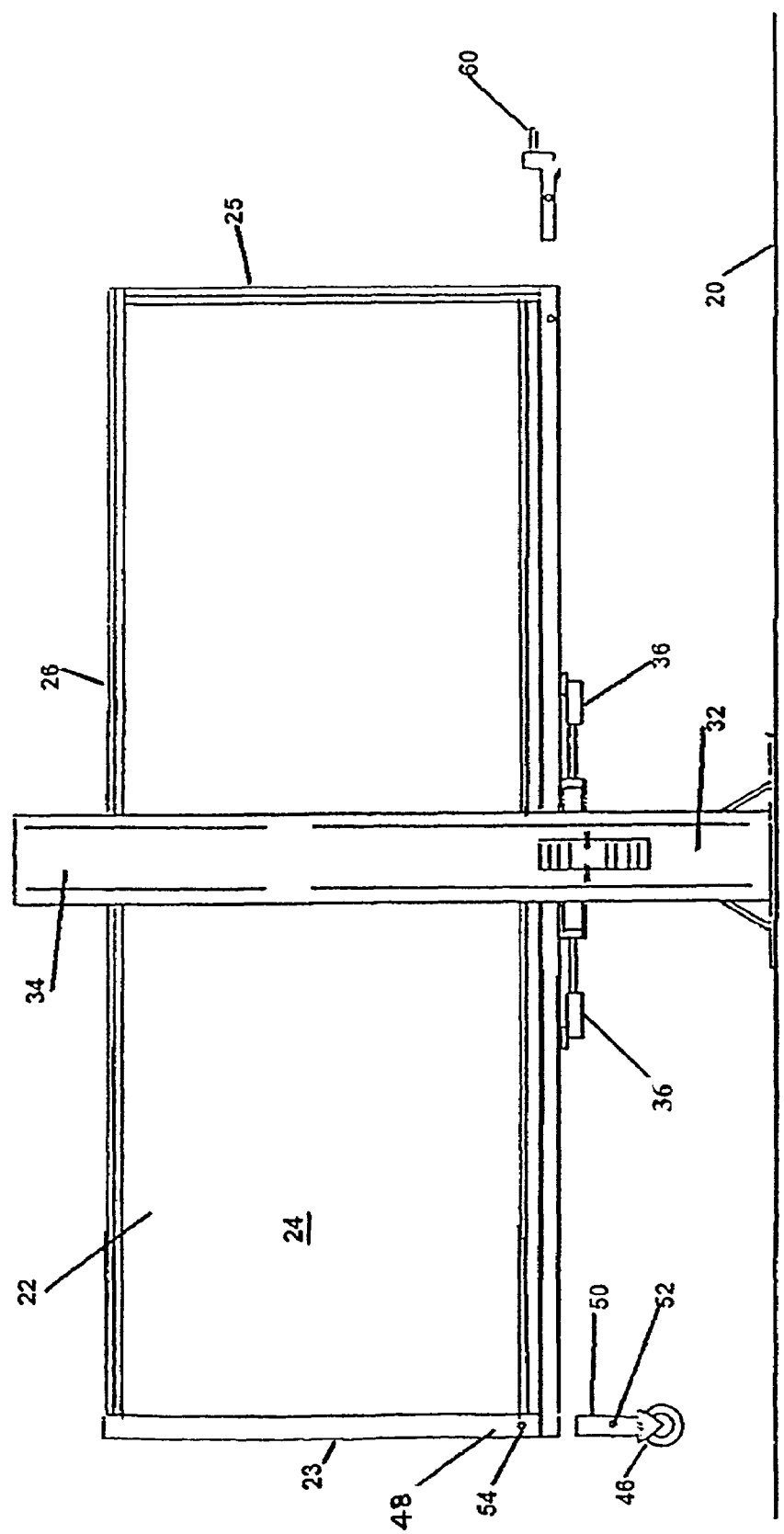
FIG. 5 is a partially exploded, side elevation view of the storage container of the present invention on the lift.

As is illustrated in FIGS. 4 and 5, the lift 32 typically comprises a pair of upright supports 34 positioned on either side of the storage container 22. One of the supports 34 is illustrated in FIGS. 4 and 5. The other (unseen) support is typically an identical mirror image of the first support and is located on the opposite side of the storage container 22. The lift 32 typically includes a pair of extendable arms 36 which are hingedly attached to the upright support 34 for movement and placement under the storage container 22.

The storage container 22 is removed from the trailer 14 by detaching the side lockdown unit(s) 19, and disengaging the flange 29 from the rear lock down bracket 28. Detaching the lockdown units 19, 28 and 29 separates the storage container 22 from the trailer 14. The storage container 22 is then lifted via the action of the lift 32. Once the storage container 22 has been released and elevated from the trailer 14, the trailer 14 is moved out of the way, typically by the truck 12.

Referring now to FIGS. 5 through 8, removing the storage container 22 from the trailer 14 is described. The unit 10 comprising the truck 12, trailer 14 and storage container 22 on the trailer 14 is typically pulled into a shop area and positioned adjacent to the lift 32. The lift arms 36 of the lift 32 are placed in position on the underside 40 of the storage container 22. The lockdown units 19 on the trailer 14, which hold the storage container 22 to the trailer 14, are then released. The lift 32 is then activated to elevate the lift arms 36, which in turn elevate the storage container 22 from the trailer 14 to the desired height. The truck 12 and trailer 14 are removed from under the storage container 22, and the storage container 22 is lowered to the desired height.

Figure 6:
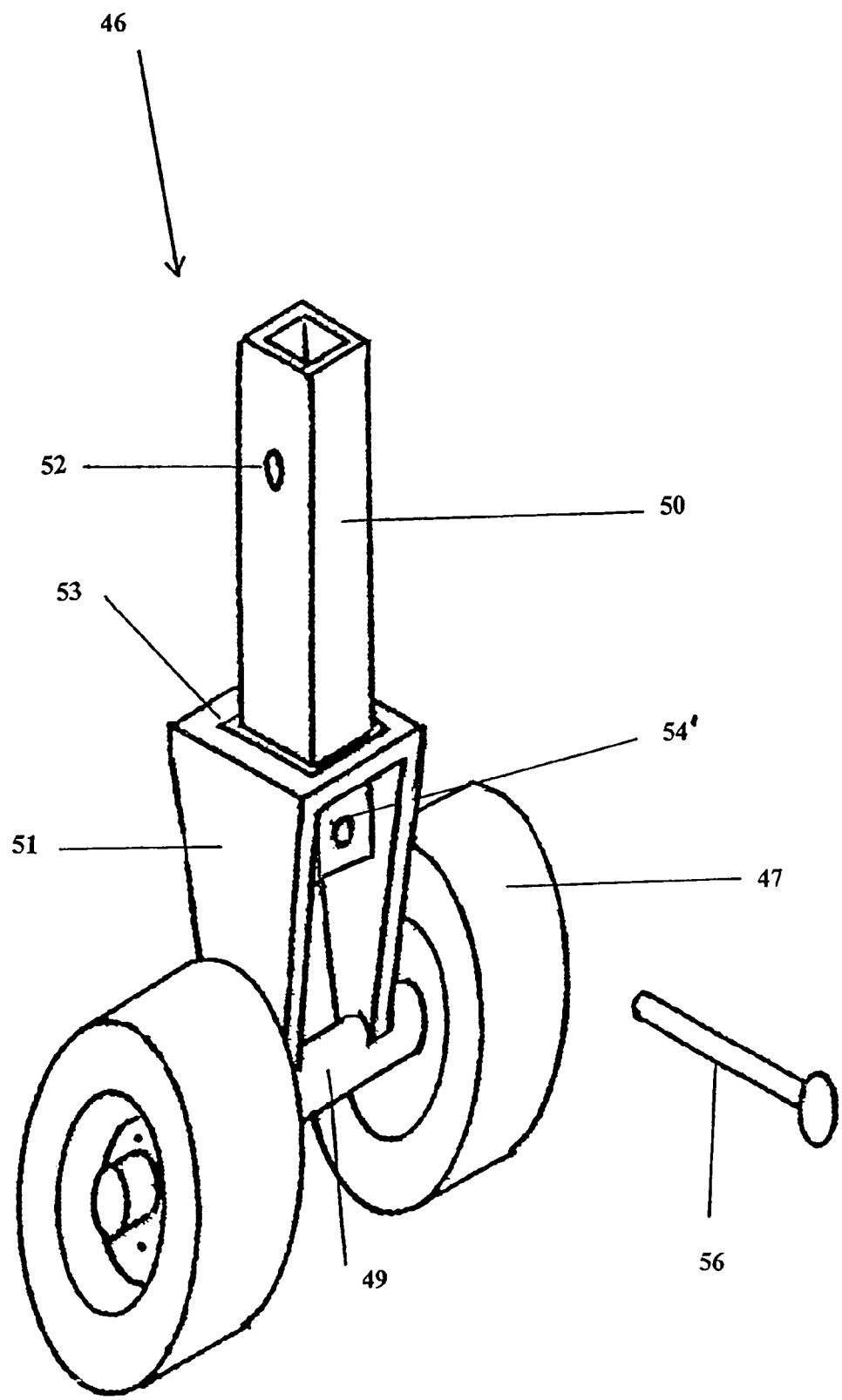
FIG. 6 is a perspective view of the portable dolly wheels of the present invention.

Referring now to FIGS. 5 and 6, portable dolly wheel assemblies 46 are inserted into rear corner shafts 48 of the storage container 22 via extensions 50. The dolly wheel assemblies allow for easier portability of the storage container 22 once it has been lowered to the ground 20. The portable dolly wheel assemblies 46 are preferably trailer wheels dimensioned and configured in a very robust and sturdy fashion. The wheel assemblies must be sufficiently sturdy to transport a large and completely filled container 22 over potentially rough terrain (e.g., up and down curbs, over broken pavement, etc.).

As illustrated in FIG. 6, each the dolly wheel assembly 46 preferably comprises a set of wheels 47 attached by an axle 49 to a forked support 51. As shown in the figure, the forked support 51 is attached to an extension 50 which is designed to fit matingly within the rear corner shaft 48 (see FIG. 5) of the storage container 22. Alternatively, as illustrated in FIG. 6, the extension 50 is slidably supported within an opening 53 in the forked support 51. In this embodiment, the extension 50 can be extended and retracted within the opening 53. Thus, when the dolly assembly is to be attached to the container, the extension 50 is extended, and then secured by a locking pin 56 passing through aperture 54' to the forked support 51. The slidably supported center post extension 50 reduces the height the rear 23 of the container 22 needs to be lifted to insert or remove the dolly wheel assemblies 46, thereby increasing the utility of the invention. In this manner, the support container 22 advantageously does not have to raised as high by the lift either to place the dolly wheels 46 in the rear corner shafts 48 of the storage container 22 or to remove the dolly wheel assemblies 46 from the rear corner shafts. The extensions 50 may simply be raised or lowered to the desired height.

The extensions 50 also include at least one opening 52. The opening(s) 52 are designed to align in registration with corresponding openings 54 in the rear corner shafts 48. Once the dolly wheel assemblies 46 have been inserted within the shaft 48, a locking pin 56 (as shown in FIG. 6) is placed through the openings 54 and 52 to secure the dolly wheels 46 to the storage container 22. It is within the scope of the present invention to have other means of securing the dolly wheels 46 to the storage post 48, such as clips, friction fittings, and the like. Further, although dolly wheel assemblies 46 are described here, it is also within the scope to have other attachments to aid moving the container 22 after it is removed from the trailer 14. For example, the dolly wheel assemblies 46 can be replaced by sleds.

Figure 7:
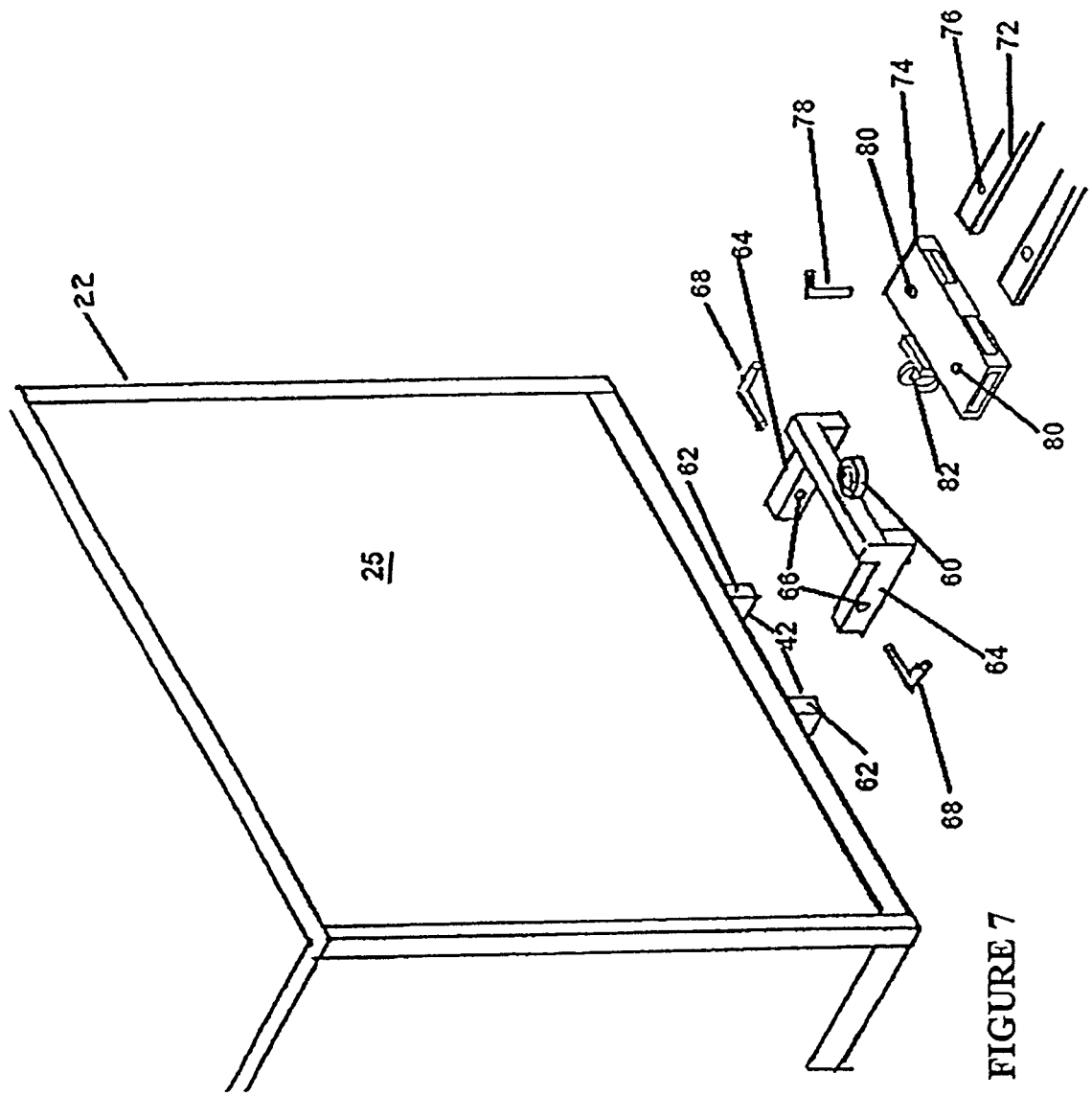
FIG. 7 is a partial perspective and exploded view of the front section of the storage container illustrating the placement of the pintle hitch and pintle ring.

FIG. 7 partially illustrates the front 25 of the storage container 22. A separable pintle ring mechanism 60 is provided which fits within openings 62 of the slides 42. The pintle ring 60 must be made of strong material, such as steel, iron or the like in order to withstand heavy pressures from pulling the storage container 22. The pintle ring 60 is defined by two arms 64, each of which are provided with one or more openings 66 for receiving a locking pin 68. In operation, the arms 64 are placed within the openings 62 of the slides 42. Corresponding openings (not shown) alongside the slides 42 are aligned with the openings 66 in the arms 64 of the pintle ring 60 in similar manner to the locking procedure of the dolly wheel assemblies 46 as illustrated in FIG. 5. The locking pin 68 or a similar mechanism locks the pintle ring 60 into the slides 42. In this manner, a pintle ring 60 is attached to the storage container 22. The pintle ring can then be used to attach a transportation device to the container (thereby to transport the container to a desired location).

Figure 8:
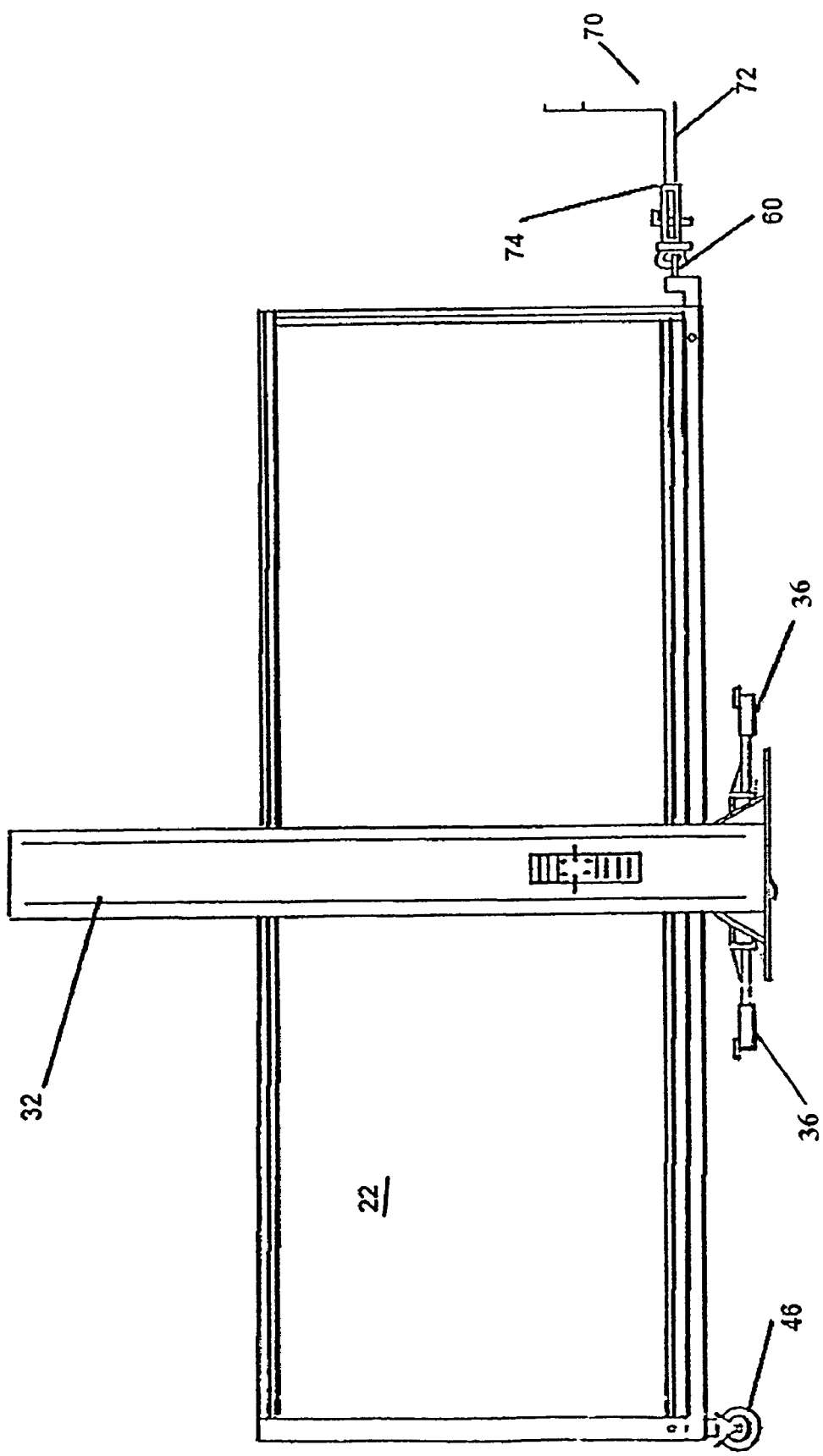
FIG. 8 is a side elevational view of the storage container illustrating the placement of the portable wheel dollies and the pintle hitch and ring.
Figure 9:
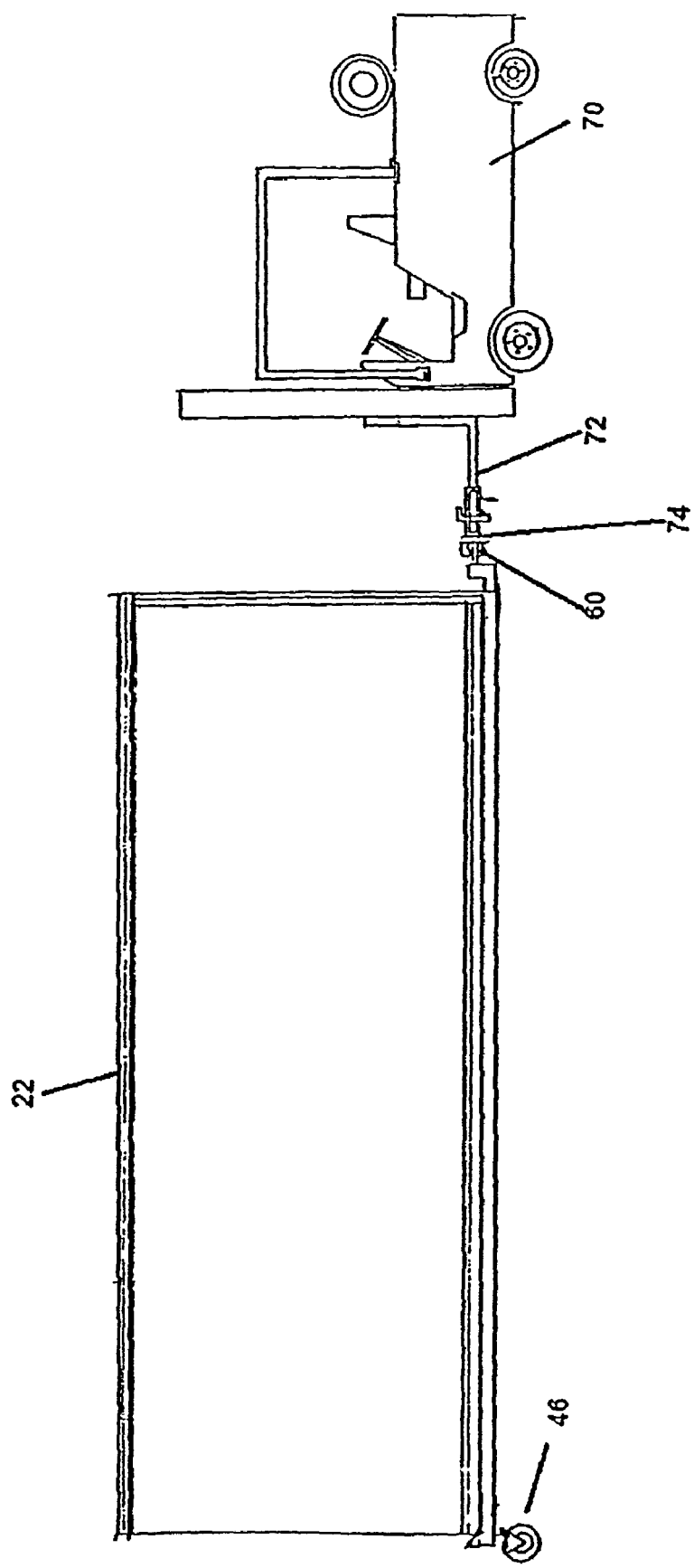
FIG. 9 is a perspective view illustrating the movement of the storage container via a forklift.

Referring now to FIGS. 7, 8, and 9, the storage container 22, ready for transport with the rear dolly wheel assembly 46 and pintle ring mechanism 60 in place, is illustrated. Once the storage container 22 with the pintle ring 60 and portable dolly wheel assembly 46 are in place, the storage container 22 is lowered to ground level. At this point, the storage container 22 can be moved to a storage location. One means of moving the storage container 22 is by means of a forklift 70 (see FIG. 9) which includes standard arms or tines 72, known to the art. The forklift 70 is preferably modified to receive a pintle hitch 74, which attaches to the fork arms 72. The pintle hitch is dimensioned and configured to engage the pintle. The only augmentation required for a standard forklift 70 is to provide openings 76 in the fork arms 72 (see FIG. 7) to secure a forklift pintle hitch 74 with locking pins 78 (see FIG. 7) in corresponding traversing openings 80 in the forklift pintle hitch 74 and openings 76 in the fork arms 72. Coupler 82 (see FIG. 7) is dimensioned and configured to engage the pintle ring 80 in a releasable fashion. In this manner, a forklift can be used to maneuver the container 22.

Referring now to FIG. 9, the forklift 70 with the pintle hitch 74 attached is positioned in front of the storage container 22 such that the pintle hitch 74 (which is connected to fork arms 72) connects with the pintle ring 60 to secure the forklift 70 to the storage container 22. The fork arms 72 on the forklift 70, which include the forklift pintle hitch 74 attached to the pintle ring 60, are raised such that the front of the storage container 22 is elevated to a desired height for towing. The forklift 70 then maneuvers the storage container 22 to a desired location. Once at the desired location, the forklift 70 lowers the front end of the storage container to the ground. The forklift pintle hitch 74 is removed from the fork arms 72 on the forklift 70. At this point, the storage container 22 can remain in storage in its current condition.

Alternatively, the storage container 22 can be manipulated such that the dolly wheel assembly 46 and the pintle ring 60 are removed. One means for accomplishing this is to place the forklift 70, without the forklift pintle hitch 74, under the front of the storage container 22 such that the fork arms 72 of the forklift 70 raise the storage container 22 to an elevation sufficient to allow the removal of the pintle ring 60 from the front of the container. Once the pintle ring 60 has been removed, the fork arms 72 on the forklift 70 are lowered to lower the storage container to the ground. The forklift 70 is then transported to the rear 23 of the storage container 22. The fork arms 72 on the forklift 70 are then placed under the storage container 22 to elevate the storage container 22 to a height which will allow the dolly wheel assemblies 46 to be removed from each rear corner shaft 48. Once the dolly wheel assemblies 46 are removed, the rear 23 of the storage container 22 is lowered to ground level.

The storage container 22 may stay in this position indefinitely. A customer or owner can then have access to the cargo disposed within the storage container at will. If the container is no longer needed, or is required at a different location, the container can be moved to the new location. This is accomplished by reversing the steps recited above and then moving the container to another location.

Figure 10:
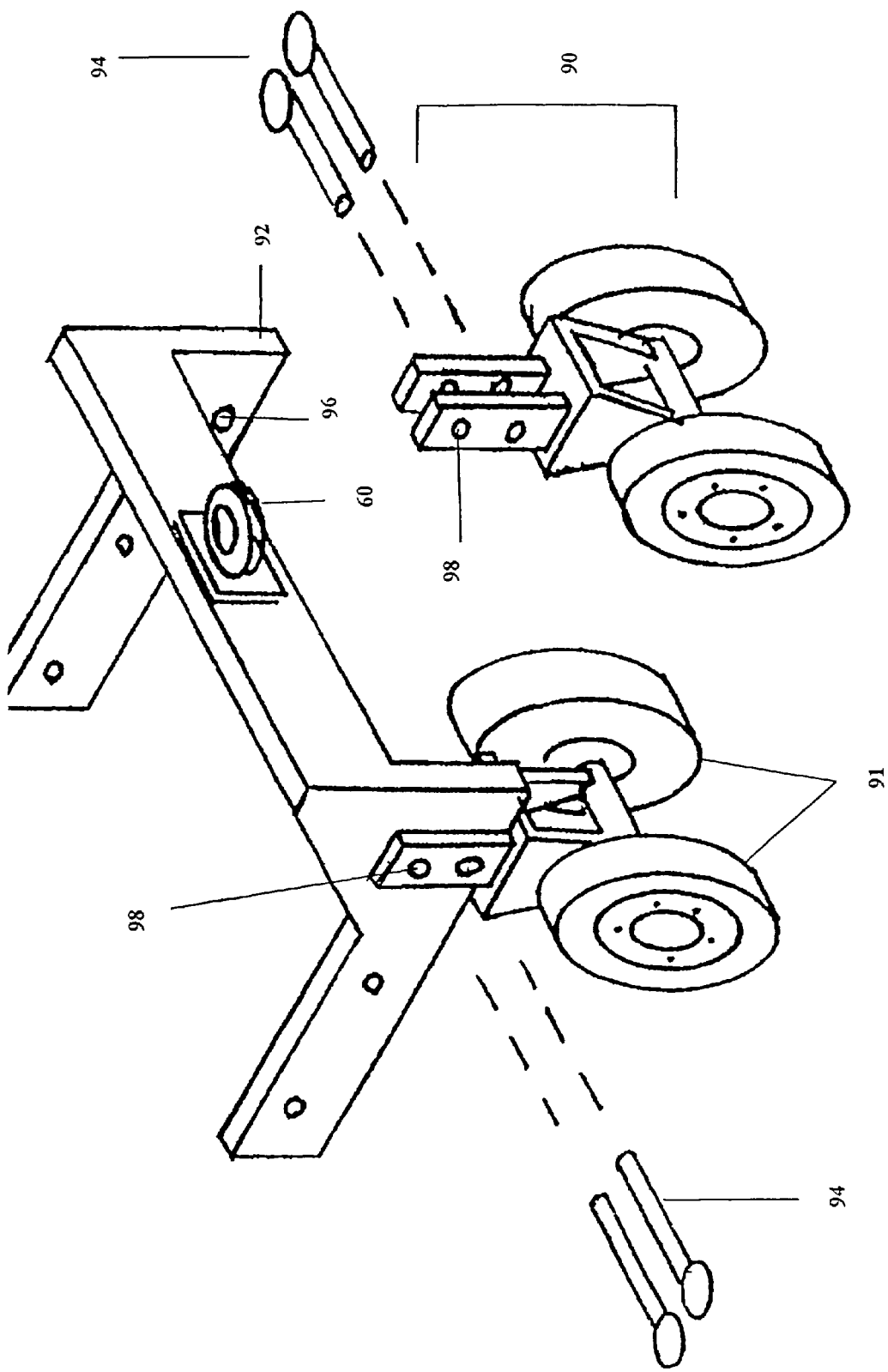
FIG. 10 is a perspective view of an alternative embodiment of the pintle ring and hitch mechanism illustrating additional wheel dollies.

Referring now to FIG. 10, a pintle ring 60 with a set of portable dolly wheel assemblies 90 attached is shown. As shown in FIG. 7, the pintle ring 60 attaches to the slides 42 located on the front 23 of container 22; the slides 42 run from the front 25 to the rear 23 of the container 22 (as shown in FIG. 3). The pintle ring 60 can also be inserted into the slides 42 and attached by locking pins 68 on the rear 23 of body 22 if needs be. By inserting and attaching a pintle ring 60 into the slides 42 on the rear 23 of the container 22, as well as to the front 25 of container 22, the container can have pintle ring at both its front end and at its rear end. This allows the container 22 to be towed from either the front or the the rear 23. Further, when the dolly wheel assemblies 90 are attached to the pintle ring mechanism 60, they can be attached to either end of the container 22. This results in two pintle rings 60 with portable wheels 90 attached connected to the front 25 and rear 23 of the container 22 at the same time, fully supporting the container 22 by dolly wheel assemblies 90 on both ends.

The pintle ring mechanism 60, with its own set of portable dolly wheel assemblies 90, can also be secured to the front 25 of the storage container 22 alone. The portable dolly wheel assemblies 90 can be attached with locking pins 94 for quick removal or can be attached by nuts and bolts (not shown) for a more permanent arrangement. The pintle ring dolly wheel assemblies 90 can be attached to the pintle ring 60 through shafts 92 on the pintle ring 60 and secured by locking pins 94 placed through openings 96 on the pintle ring shaft 92 and corresponding openings 98 on the portable dolly wheel assemblies 90. The pintle ring 60 is then placed onto the storage container 22 as described previously. Each portable dolly assembly 90 preferably contains two wheels 91, as illustrated in FIG. 10. When the container 22 is supported at all 4 lower corners by a dolly wheel assembly, the storage container 22 can be transported by means other than the forklift 70 as described above, or several containers can be linked together in a train.

In addition, when supported at all four lower corners by a dolly wheel assembly, the storage container 22 can be rolled onto a carrier trailer, typically called a rollback car carrier or trailer. The storage container 22 can then be secured to the trailer for transportation via a truck or trailer mechanism.

The steps to deliver a storage container 22 to a specified location are as follows. The storage container 22 is moved to a position between the lift 32 as described previously and illustrated in FIG. 4. The lift 32 raises the storage container 22 to a desired height so that the portable dolly wheels 46 and 90 can be attached to both ends of the storage container 22 via shafts 62 and 92. A rollback truck or trailer 14 is then moved into position under the storage container 22 with the portable dolly wheels 46 and 90 attached on both ends. The storage container 22 is lowered onto the trailer 14 and secured for transport to a desired customer location. At that location, the storage container 22 is released from the trailer 14. The trailer 14 is then tilted, allowing the storage container 22 to roll off the trailer 14. After removing the storage container 22 from the trailer 14, a hydraulic jack or other lifting mechanism may be placed in front of the storage container 22 to raise the front 25 of the storage container 22 to a height whereby the pintle ring 60 engages with the portable dolly wheels 46 to be removed from the front 25 of the storage container 22. The front 25 is then lowered to the ground 20 by the same lifting mechanism. The mechanism is then placed under the rear 23 of the storage container 22 to raise the rear 23 of the storage container 22 to a height which will allow the portable dolly wheels 46 to be removed. The lifting mechanism then lowers the rear of the storage container 22 to the ground 20. At this point, the storage container 22 remains in this position until it is time to be removed, when the above-referenced steps are reversed.

It is understood that the invention is not confined to the particular construction and arrangement of parts herein illustrated and described, but embraces all such modified forms thereof as come within the scope of the following claims.

What is claimed is:

1. A mobile transport and storage system including a flatbed trailer supported by wheels and adapted to be removably attached to a truck, the flatbed trailer comprising:

a. a platform defined thereon, wherein the platform remains substantially horizontal with the ground and includes a plurality of parallel guides, the plurality of parallel guides being positioned and extending along the length of the flatbed trailer;
   b. a removable and reusable storage container supported on the platform, wherein the storage container comprises:
      i. a substantially rectangular base and frame construction with a rear wall comprising a movable door, two side walls, a front wall, a roof and an underside, wherein the rear wall includes openings for receiving locking pins to secure portable dolly wheels, and
      ii. two slides defined in, or disposed on, the underside of the storage container, wherein the two slides are substantially parallel to one another, and wherein the two slides run lengthwise in a direction extending from the front wall of the storage container toward the rear wall of the storage container, and wherein the two slides are dimensioned and configured to abut the parallel guides of the platform when the storage container is disposed on the platform;
   c. at least one lock down unit to releasably secure the storage container to the platform of the flatbed trailer;
   d. a free-standing lift, wherein the free-standing lift is not attached to the flatbed trailer or the truck and includes at least a pair of arms and upright supports selectively engageable with the storage container and configured to lift and remove the storage container from the platform and lower the storage container to ground level for relocation to a remote location, wherein the free-standing lift includes a pair of extendable arms hingedly attached to an upright support for movement and placement under the storage container for lifting the storage container off the platforms
   e. removable dolly wheels attached by an axle and a forked support within the openings in the rear wall of the storage container; and
   f. at least one separable pintle ring mechanism for placement on the front or rear of the storage container, wherein the pintle ring is defined by two arms, each of which are provided with at least one opening for receiving a locking pin, wherein the addition of the removable dolly wheels and the pintle ring to the storage container forms a mobile storage container, wherein the slides comprise openings at the front wall of the storage container and the rear wall of the storage container, wherein the openings are configured to receive the two arms of the pintle ring.

2. The mobile transport and storage system of claim 1 further comprising a transportation device adapted to be releasably connected to the mobile storage container for transporting the mobile storage container to the remote location, the transportation device including a pintle hitch adapted to connect to the pintle ring to secure the transportation device to the mobile storage container.

3. The mobile transport and storage system of claim 2 further comprising, in combination, a fork lift dimensioned and configured to releasably engage the pintle hitch.

* * * * *